US006388571B1

(12) United States Patent
Kirino

(10) Patent No.: US 6,388,571 B1
(45) Date of Patent: May 14, 2002

(54) MONITORING DEVICE COMPRISING A MASTER MACHINE AND SLAVE MACHINE

(75) Inventor: Hideki Kirino, Kagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/787,512

(22) PCT Filed: Jul. 18, 2000

(86) PCT No.: PCT/JP00/04808

§ 371 Date: May 18, 2001

§ 102(e) Date: May 18, 2001

(87) PCT Pub. No.: WO01/06789

PCT Pub. Date: Jan. 25, 2001

(30) Foreign Application Priority Data

Jul. 19, 1999  (JP) ............................................ 11-204109

(51) Int. Cl.[7] ............................................... G08B 13/00
(52) U.S. Cl. .................... 340/541; 340/545.1; 340/506; 340/540; 340/539; 340/693; 348/143; 348/148; 348/149; 348/152; 348/153; 348/159
(58) Field of Search ............................. 340/541, 545.1, 340/506, 540, 539, 693; 348/143, 148, 149, 152, 153, 159

(56) References Cited

U.S. PATENT DOCUMENTS 4,992,866 A    2/1991  Morgan ...................... 358/108
5,508,737 A  *  4/1996  Lang .......................... 348/159
5,850,180 A  * 12/1998  Hess .......................... 340/541
5,995,140 A  * 11/1999  Cooper et al. ............. 348/159
6,208,376 B1 *  3/2001  Tanaka et al. .............. 348/153

FOREIGN PATENT DOCUMENTS

| CH | 651984 | 10/1985 | ............ G08B/15/00 |
| GB | 2064189 | 6/1981 | ............ G08B/13/18 |
| GB | 2256771 | 12/1992 | ............ H04M/11/00 |
| JP | 11-55654 | 2/1999 | ............ H04N/7/18 |
| WO | 96/03005 | 2/1996 | ............ H04N/7/18 |

* cited by examiner

Primary Examiner—Daniel J. Wu
Assistant Examiner—Tai T. Nguyen
(74) Attorney, Agent, or Firm—Wenderoth, Lind & Ponack, L.L.P.

(57) ABSTRACT

The monitoring device according to the present invention is a monitoring device A which comprises a master machine 101 comprising plural cameras 102, a camera interface circuit 103, a master machine control unit 104, a master machine radio transmitter 105, a master machine antenna 106, a recording unit 107, master machine operation buttons 108 and a power circuit 109, and a slave machine 110 comprising a slave machine antenna 111, a slave machine radio transmitter 112, a monitor unit 113, a monitor interface circuit 114, a slave machine control unit 115, slave machine operation buttons 116, a lamp 117, a buzzer 118, a vibrator 119 and a battery 120, as shown in FIG. 1.

22 Claims, 3 Drawing Sheets

MONITORING DEVICE COMPRISING A MASTER MACHINE AND SLAVE MACHINE

TECHNICAL FIELD

The present invention relates to a monitoring device and, more particularly, to the monitoring in a small-scale store or the like which is managed by a few staffs.

BACKGROUND ART

A conventional monitoring device 301 has a structure as shown in FIG. 3. As shown in FIG. 3, this conventional monitoring device 301 has plural cameras 302 (four cameras in FIG. 3), a camera interface circuit 303, a control unit 304, a recording unit 305, operation buttons 306, a power circuit 307, a monitor interface circuit 308, a monitor unit 309, and an emergency button/door contact 310.

The operation of this monitoring device 301 is briefly described with reference to FIG. 3.

Initially, the operation buttons 306 of the monitoring device 301 are operated to set the recording mode of the monitoring device 301. As the recording mode, there are a "normal mode" in which images taken by the cameras 302 are recorded at one of frame advance speeds: (one frame in several seconds), (one frame in several minutes) and (frame advance at a lower speed), and an "emergency model" in which images taken by the cameras 302 are recorded at a higher frame advance speed than that of the "normal mode". The frame advance speed at which the images taken by the cameras 302 are recorded is set for each of the modes.

In addition, it is possible to previously set the selection of images, i.e., which images are to be recorded among the images taken by the plural cameras 302. For example, the setting that the recording is successively switched in the following order: images taken by the camera 302a, images taken by the camera 302b, images taken by the camera 302c and images taken by the camera 302d at predetermined periods is possible.

When the setting of the recording mode is terminated, the monitoring operation is started in the normal mode. The monitoring device 301 records the images taken by a previously selected camera 302 in the recording unit 305, in accordance with the previously set recording mode. While these images are recorded, an image which is being taken by the camera 302 is displayed on the monitor unit 309 to show the image which is being taken by the camera 302 to a user.

At this time, when the user perceives the emergency and pushes the emergency button 310, the monitoring device 301 switches the mode into the previously set emergency mode, and records the images which are taken by the previously selected camera 302 in the recording unit 305.

When the "emergency mode" is set so that the images are always recorded without the emergency button 310 being pushed and the images which have been already recorded are retained without being overwritten when the emergency button 310 is pushed, the images before the emergency button 310 is pushed also can be recorded.

As described above, the conventional monitoring device 301 is used for the image recording in accordance with the recording mode. Besides, in a small-scale store such as a convenience store, the monitoring device 301 can shoot places behind the shelves of goods, which are not seen by a cashier, using the cameras 302. Then, the images taken by the cameras 302 are displayed on the monitor 309, whereby whether these are many customers or not can be grasped. Further, when the monitor 309 is installed in a place which can be seen by the customers to inform the customers that the store is being shot by the monitoring cameras, the monitoring device is used to prevent wrongful acts such as shoplifting.

However, when the above-mentioned monitoring device 301 is used in the small-scale store, such as a convenience store, which is managed by a few staffs, the monitor 309 is normally installed near the register. Therefore, for example when the staff has to leave the vicinity of the register to go for the goods to be supplied to the storage or to arrange the goods in the shelves, i.e., while the staff is doing these works, the staff cannot grasp whether or not there are many customers in the store or monitor the store.

In addition, when the monitoring device is used in the above-mentioned way, the clerk can grasp movements of the customers by seeing the monitor 309 when the clerk is near the register. Thus, when a customer approaches the register to make the payment for example, the clerk can serve the customer immediately. However, when the customer approaches the register to make the payment when the clerk is away from the register, the clerk cannot serve the customer immediately. The prior art has problems in serving the customers.

Further, when an illegal act such as robbery and shoplifting occurs when the staff is away from the register, since the emergency button provided in the monitoring device 301 is also placed near the register in many cases, the staff cannot push the emergency button immediately even if he/she finds this illegal act. Consequently, the monitoring device fails to take the images in the emergency, which may evidence the illegal act.

The present invention is made to solve the above-mentioned problems. It is an object of the present invention to provide a monitoring device which enables to always easily grasp the circumstances in a small-scale store, such as a convenience store having a few clerks, wherever the clerks are.

DISCLOSURE OF THE INVENTION

A monitoring device according to the present invention (claim 1) comprises one master machine and at least one slave machine, and in the monitoring device, the master machine comprises at least: plural cameras; video signal output means for outputting images taken by the plural cameras as video signals; entrance detection means for detecting an entrance of a mobile body and outputting a mobile body detection signal, when the mobile body enters one of shooting ranges of the plural cameras; mobile body image selection means for automatically selecting images taken by one of the cameras, which camera has shot the mobile body, in accordance with input of the mobile body detection signal; master machine radio transmission means for transmitting the video signals and the mobile body detection signal to the slave machine as well as receiving a signal transmitted from the slave machine; and shooting camera switching means for selecting the images taken by the camera in accordance with the signal transmitted from the slave machine, and the slave machine comprises at least: image selection means for selecting one of the video signals of the images taken by the plural cameras; image selection signal generation means for outputting an image selection signal to the master machine when the image selection means are operated; a monitor unit for displaying the video signal selected by the image selection means; at least one warning unit for issuing a warning in accordance with the mobile body detection signal; actuation means for actuating the warning unit when the mobile body detection signal is received; and slave machine radio transmission means for transmitting the image selection signal as well as receiving the signals transmitted from the master machine.

According to the so-constructed monitoring device, the radio contact can be established between the slave machine having the monitor unit and the master machine, in a small-scale store, such as a convenience store which is managed by a few clerks. Therefore, even when the clerk carries the slave machine, the information from the master machine can be transmitted to the slave machine. Accordingly, even when the clerk goes for the goods to be supplied or arranges the goods in the shelves, the clerk can monitor the store to grasp the number of customers in the store. Besides, even when the clerk is absorbed in the supply or arrangement of goods and looks asides the slave machine, the warning units inform that a customer in the store comes to the register with goods, after the mobile body is detected. Further, the staff can check this situation using the image on the monitor of the slave machine. Therefore, the quick services can be given to the customers.

According to the present invention (claim 2), in the monitoring device of claim 1, the slave machine comprises fixing means for fixing the slave machine.

According to the so-constructed monitoring device, the slave machine can be for example easily hanged on a part of the uniform of the clerk or put on a wall near the place where the clerk is. Therefore, the slave machine can be carried more easily, whereby the monitoring device becomes suitable.

According to the present invention (claim 3), in the monitoring device of claim 2, the fixing means is a hook.

According to the so-constructed monitoring device, the slave machine can for example be hanged on a part of the uniform of the clerk. Therefore, the slave machine can be carried more easily, whereby the monitoring device becomes suitable.

According to the present invention (claim 4), in the monitoring device of claim 2, the fixing means is a magnet.

According to the so-constructed monitoring device, the slave machine can for example be easily put on the wall near the place where the clerk is. Therefore, the slave machine can be carried more easily, whereby the monitoring device becomes suitable.

According to the present invention (claim 5), in the monitoring device of one of claims 1 to 4, the warning unit is a lamp.

According to the so-constructed monitoring device, even when the user looks aside the monitor, the user can know the warning immediately by the flashing light.

According to the present invention (claim 6), in the monitoring device of one of claims 1 to 4, the warning unit is a buzzer.

According to the so-constructed monitoring device, even when the user is slightly away from the slave machine, the user can know the warning immediately by the sound.

According to the present invention (claim 7), in the monitoring device of one of claims 1 to 4, the warning unit is a vibrator.

According to the so-constructed monitoring device, the user can know the warning without being noticed by those around the user, such as customers.

According to the present invention (claim 8), in the monitoring device of one of claims 1 to 4, the warning unit is at least one of a lamp, a buzzer and a vibrator.

According to the so-constructed monitoring device, even when the user is away from the slave machine, the warning can be informed to the user. Further, when the two or more warning units are combined, the warning can be informed more surely.

According to the present invention (claim 9), in the monitoring device of one of claims 1 to 8 comprises: the mobile body detection signals as many as the plural cameras, said mobile body detection signals having contents which differ; and the actuation means corresponding to each of the mobile body detection signals having the contents which differ.

According to the so-constructed monitoring device, the camera which has detected the mobile body can be known immediately. Therefore, the clerk can cope with the mobile body quickly, whereby the monitoring device becomes more suitable.

According to the present invention (claim 10), in the monitoring device of one of claims 1 to 9, the slave machine comprises emergency recording operation means for recording circumstances in an emergency; and emergency recording signal generation means for generating an emergency recording signal when the emergency recording operation means are operated, and the emergency recording operation means starts recording the images taken by the plural cameras when the master machine receives the emergency recording signal.

According to the so-constructed monitoring device, the user can switch the images to the images to be selected with checking the monitor images taken by the plural monitoring cameras using the slave machine at hand. Further, when the staff perceives the emergency-from the monitor images of the slave machine, the staff can promptly pushes the emergency buttons. Therefore, the good monitoring device which is efficient and sufficient even when the staff is away from the register and does not fail to take images in the emergencies can be provided.

BEST MODE FOR CARRYING OUT THE INVENTION

Hereinafter, an embodiment of the present invention will be described with reference to the drawings. The embodiment described herein is shown as an example and the present invention is not limited to this embodiment.

Embodiment 1

Initially, a monitoring device A according to the present invention is described as a first embodiment with reference to the drawings.

This monitoring device A comprises one master machine 101 and one slave machine 110. However, the number of the slave machine 110 is not always limited to one. For example, the monitoring device A may comprise one master machine 101 and plural slave machines 110. However, in the following description, assume that one slave machine 110 is provided.

Figure 1:
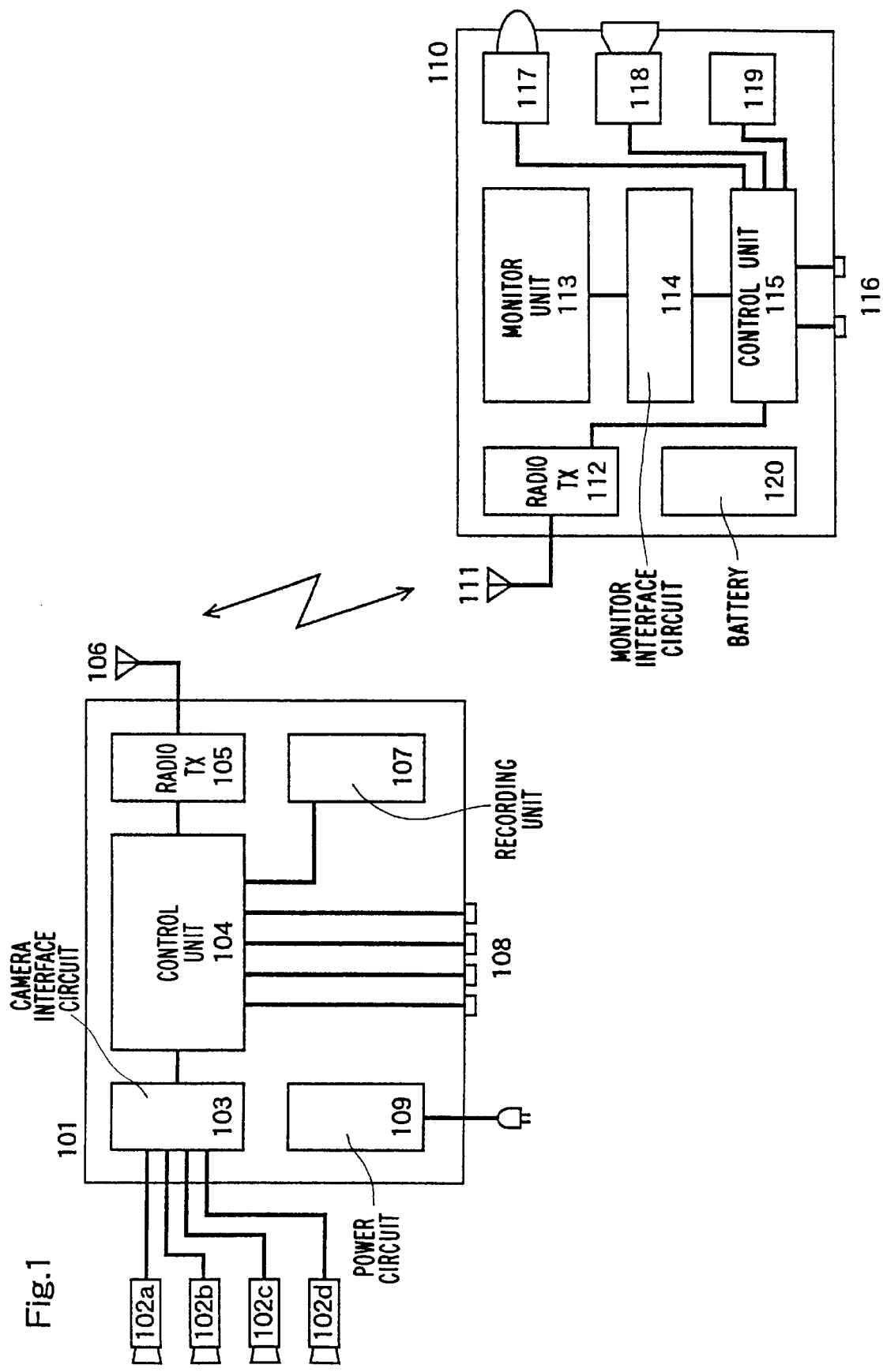
FIG. 1 is a block diagram illustrating a monitoring device according to an embodiment of the present invention.
Figure 2:
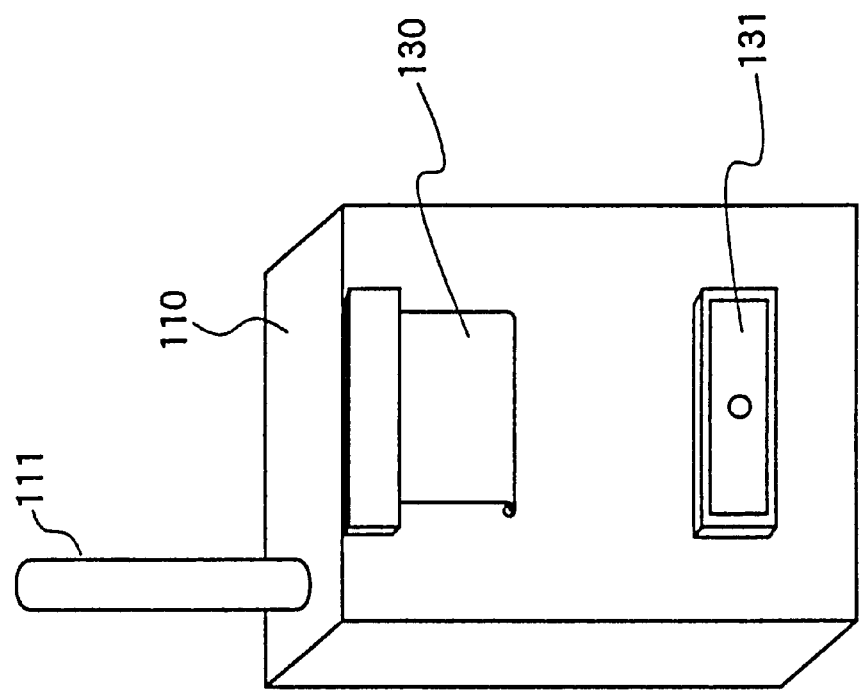
FIG. 2 are external views illustrating a slave machine according to the embodiment of the present invention.
Figure 2:
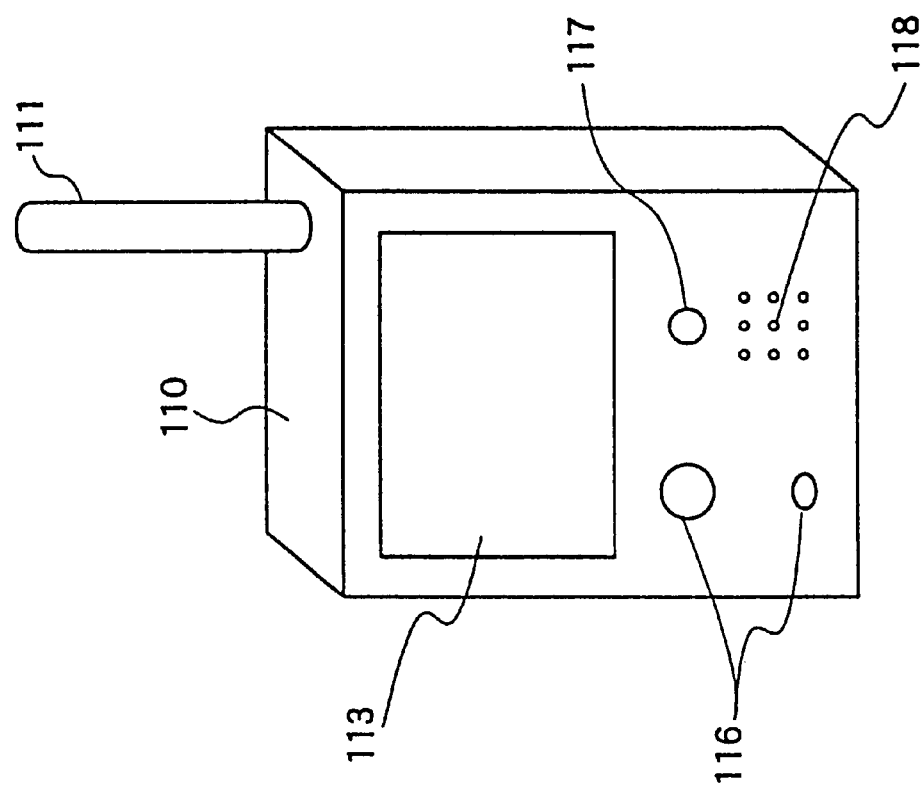
Figure 3:
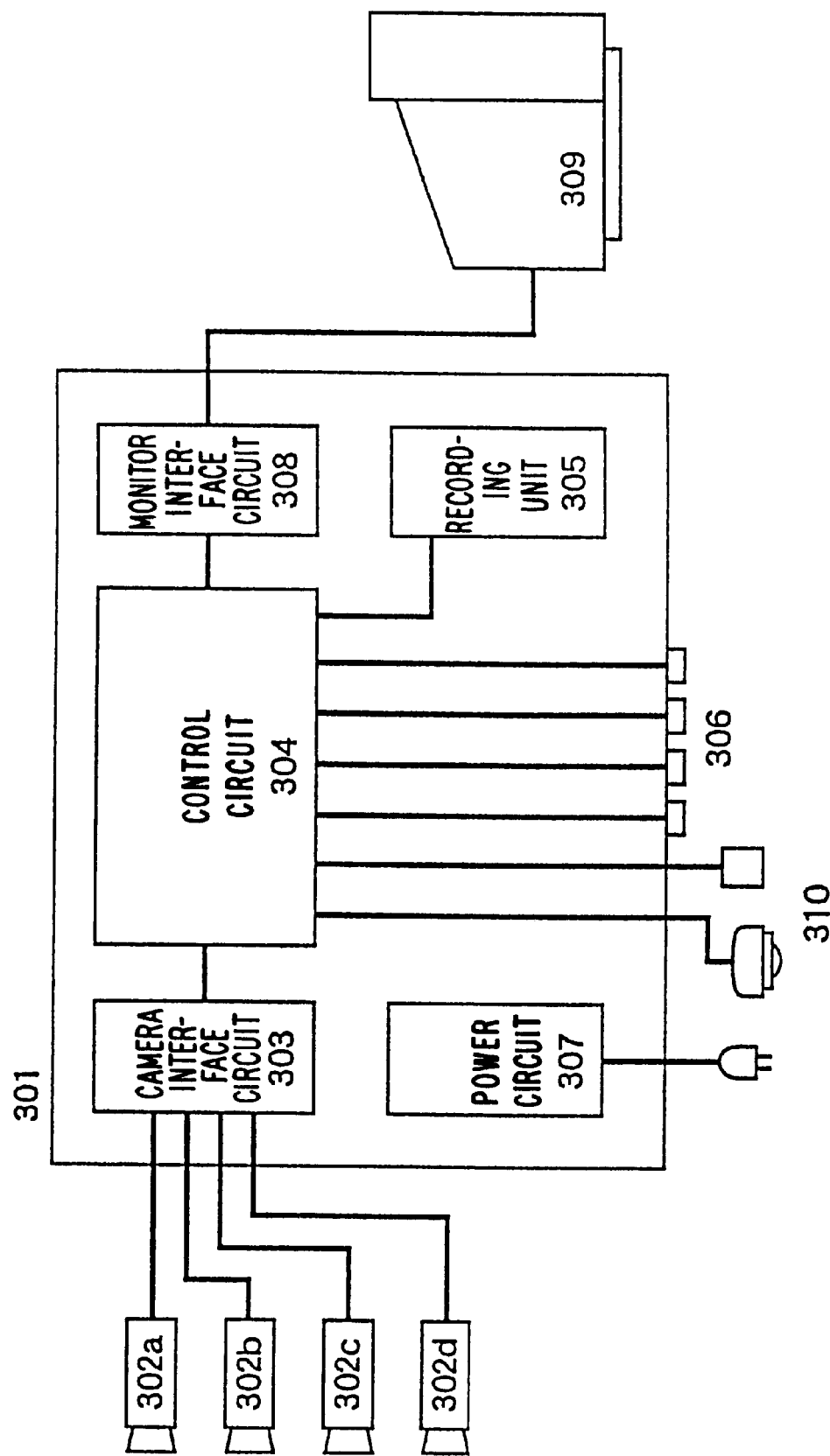
FIG. 3 is a block diagram illustrating a prior art monitoring device.

FIG. 1 is a block diagram illustrating a structure of the monitoring device A comprising one master machine 101 and one slave machine 110. FIG. 2 are external views illustrating the slave machine 110.

Elements of the monitoring device A are described with reference to FIG. 1.

As shown in FIG. 1, the monitoring device A comprises the master machine 101 and the slave machine 110.

The master machine 101 comprises plural cameras 102a, 102b, 102c and 102d, a camera interface circuit 103, a master machine control unit 104, a master machine radio transmitter 105, a master machine antenna 106, a recording unit 107, master machine operation buttons 108, and a power circuit 109.

The slave machine 110 comprises a slave machine antenna 111, a slave machine radio transmitter 112, a monitor unit 113, a monitor interface circuit 114, a slave machine control unit 115, slave machine operation buttons 116, a lamp 117, a buzzer 118, a vibrator 119, and a battery 120.

Next, the operations of the respective elements are described.

The cameras 102 attached to the master machine 101 take images of around a place where the master machine 101 is installed, and transmit taken images as video signals to the camera interface circuit 103. While the four cameras are available in this embodiment, the number of the cameras is not always limited to four. Plural cameras, for example three or five cameras, are required.

The camera interface circuit 103 operates as a video signal output means for outputting the video signals which are transmitted by the four cameras 102, to the master machine control unit 104.

The master machine control unit 104 has a function of a shooting camera switching means for selecting one video signal from four types of the video signals which are input by the four cameras 102 through the camera interface circuit 103, and outputting the selected signal to the master machine radio transmitter 105. This selection of the video signal is performed in accordance with an image selection signal which is transmitted by the slave machine 110, which is described later.

The master machine control unit 104 operates also as a mobile body entrance detection means for detecting that a mobile body enters one of shooting areas of the four cameras 102 as well as outputting a mobile body detection signal informing that the entrance of the mobile body is detected. Further, the master machine control unit 104 has a function of outputting the mobile body detection signal to the master machine radio transmitter 105, when the entrance of the mobile body is detected. Further, the control unit 104 also has a function of a mobile body image selection means for detecting a camera 102 among the four cameras 102, having the shooting range in which the mobile body enters, and automatically selecting the images of the camera 102 which takes the image of the mobile body.

The master machine radio transmitter 105 transmits the video signals and mobile body detection signal which are input by the master machine control unit 104, from the master machine antenna 106 toward the slave machine 110.

The master machine operation buttons 108 set the recording mode of the monitoring device A. This recording mode is the same as that in the aforesaid conventional monitoring device 301. While the setting of the recording mode is performed using the master machine operation buttons 108 here, this operation does not always require the buttons. The images taken by the cameras 102 are recorded in the recording unit 107, in accordance with the recording mode which is set by the master machine operation buttons 108.

The recording unit 107 records all or part of the images taken by the cameras 102, in accordance with the recording mode which is set by the master machine operation buttons 108. For example, these images can be recorded on videotapes. However, the recording method is not limited to this method. When the videotapes are endless videotapes, the latest image can always be recorded. In addition, the images to be recorded taken by a camera 102 are selected among the four cameras 102 in accordance with the image selection signal transmitted by the slave machine 110, which is described later.

The slave machine radio transmitter 112 receives the video signal and mobile body detection signal which are transmitted by the master machine 101 via the slave machine antenna 111, and outputs these signals to the slave machine control unit 115. In addition, the transmitter 112 transmits the image selection signal which is described later to the master-machine 101.

The slave machine control unit 115 outputs the video signal transmitted by the master machine 101 to the monitor interface circuit 114. Then, the monitor interface circuit 114 converts this video signal into an image, and displays the image on the monitor 113.

In addition, the slave machine control unit 115 has an actuation means which actuates the lamp 117, the buzzer 118 and the vibrator 119 when the mobile body detection signal transmitted by the master machine 101 is input thereto.

In this embodiment, the lamp 117, the buzzer 118 and the vibrator 119 are provided as warning units. However, units other than these units can be employed. Further, only one or two of these units can be provided. In the following description, assume that the above-mentioned three units are provided.

The slave machine operation buttons 116 operate as image selection means which select images of a place which is desired by the user, among the images taken by the four cameras 102 of the master machine 101. When the slave machine operation buttons 116 are operated to select a desired camera 102, the slave machine control unit 115 generates the image selection signal and transmits the signal to the master machine 101.

In addition, as shown in FIG. 2, a hook 130 and a magnet 131 as fixing means are provided at the back of the slave machine 110. These means are not always required to be at the back of the slave machine 110. Further, it is possible to provide only one of these means. It does not matter that the slave machine 110 has no fixing means, but the fixing means are provided in this embodiment for reasons which are described later.

Hereinafter, the operation of the so-constructed monitoring device A according to this embodiment will be described. In the following description, assume that the monitoring device A is used in a convenience store.

Initially, the master machine 101 is installed in an appropriate place in the store. Here, it is important that the master machine 101 is installed in a place where the cameras 102 of the master machine can shoot whole places in the convenience store.

Next, the slave machine 110 is installed in a place where the clerk can always see the monitor 113. Since the slave machine 110 comprises the fixing means, i.e., the hook 130 and the magnet 131, when the clerk is at the register, the slave machine 110 can be provided near the register using the magnet 131. When the clerk leaves the register, the clerk can carry the slave machine 110 using the hook 130, whereby the clerk always knows how it is in the store wherever the clerk is.

When the monitoring device A is installed in this way, the operation buttons 108 of the master machine 101 are then operated to set the recording mode. The description of the recording mode is already given. When the recording mode is set, the cameras 102 start taking images in accordance with the set mode. All or part of the images taken by the cameras are recorded in the recording unit 107.

The images taken by the cameras 102 of the master machine 101 are output by the camera interface circuit 103 as video signals to the master machine control unit 104. The video signals are transmitted to the slave machine 110 through the master machine radio transmitter 105.

The video signals received by the slave machine 110, which signals are obtained from the images taken by the cameras 102, are input to the slave machine radio transmitter 112 and sent to the slave machine control unit 115. Then, the signals are sent to the monitor 113 through the monitor interface circuit 114. Then, the images taken by the cameras 102 are displayed on the monitor 113.

While the cameras 102 of the master machine 101 are taking images, when a mobile body enters in the shooting range of one of the cameras 102, i.e., the camera 102a in this case, the master machine control unit 104 receives the image of the mobile body and detects that the mobile body has entered. Then, the unit 104 automatically selects the image taken by the camera 102a and outputs the image to the slave machine 110. At the same time, the master machine control unit 104 outputs and transmits a mobile body detection signal to the slave machine 110 to inform that the entrance of the mobile body is detected.

Then, the slave machine 110 receives the video signal of the camera 102a which is automatically selected by the master machine control unit 104, and displays the image on the monitor 113. At the same time, the slave machine control unit 115 receives the mobile body detection signal output by the master machine control unit 104, and actuates the warning units. To be specific, the slave machine control unit 115 controls the lamp 117 to blink, the buzzer 118 to sound, or the vibrator 110 to vibrate.

Since the slave machine 110 is always near the clerk as mentioned above, the staff knows immediately that a customer comes to the register and can serve the customer quickly, even when the clerk is away from the register.

In this case, the clerk can always see the image of a desired one of the cameras 102 by operating the slave machine operation buttons 116.

As described above, the monitoring device A according to this embodiment can easily monitor a store even when this is managed by a few staffs, thereby being suitable. In addition, when the mobile body enters the shooting ranges of the cameras 102, the warning units are actuated. Therefore, even if the clerk looks aside the monitor 113, the clerk immediately knows the entrance of the mobile body, whereby the monitoring device is preferable.

In addition, the above-mentioned monitoring device A is constructed so that the warning units are actuated when the mobile body enters the shooting range of one of the four cameras 102. However, for example when the ways of actuating the warning units vary with the four cameras 102, it can be easily seen which one of the cameras 102 has a shooting range where the mobile body enters.

If these measures are not taken, even when the mobile body is to be checked after the actuation of the warning units is checked, it can not be seen which one of the cameras 102 detects the mobile body. Therefore, the cameras 102 should be switched successively, thereby requiring time and effort. However, when these measures are taken, the mobile body can be quickly checked.

For example, the shooting ranges of the cameras 102a~102d are previously decided. For example, the camera 102a is set to take images of the register, the camera 102b is set to take images of the entrance, the camera 102c is set to take images of half of the selling area, and the camera 102d is set to take images of the other half of the selling area.

When the mobile body enters in the shooting range of one of the cameras 102, taking the camera 102a in this case, the mobile body detection signal is output by the master machine control unit 104 as mentioned above. The content of the signal is previously decided so as to vary with cameras. That is, the master machine control unit 104 is previously set to output a mobile body signal 1 when the camera 102a detects the entrance of the mobile body, a mobile body signal 2 when the camera 102b detects the entrance of the mobile body, a mobile body signal 3 when the camera 102c detects the entrance of the mobile body, and a mobile body signal 4 when the camera 102d detects the entrance of the mobile body.

At the same time, in the slave machine control unit 115, the ways of actuating the warning units, for example, the blinking ways of the lamp 117, the kinds of the sound of the buzzer 118, and the vibration ways of the vibrator 119 are previously set so as to vary with the kind of the received mobile body signal.

In this case, for example if the camera 102a detects the mobile body, the area where the mobile body is detected is easily known on the slave machine 110 side only by the actuation ways of the warning units. Therefore, at the same time when the warning units are actuated, switching to a desired one of the cameras 102 can be immediately performed, i.e., the clerk can quickly cope with the situations. To be specific, even when the clerk looks aside the slave machine, the clerk can easily detect that, for example, a customer as the mobile body approaches the vicinity of the register, according to the actuation types of the warning units. Further, when the clerk sees the monitor of the slave machine, displaying the images taken by the camera which detected the mobile body, the clerk can judge whether the customer comes to the register after finishing picking up goods or only passes near the register. Therefore, the clerk knows that the customer comes to the register after finishing the picking up the goods promptly. Accordingly, the clerk can quickly return to the register, whereby the good services can be given. In this case, when the switching of the images is performed automatically, it is more preferable.

In addition, the above-mentioned monitoring device A can include a means for recording situations in emergencies in detail when the emergencies such as a case where the robbers enters the store occur.

This monitoring device A includes a function of an emergency recording operation means in the slave machine operation buttons 116. When the slave machine operation buttons 116 are operated, the slave machine control unit 115 generates an emergency recording signal. When the master machine 101 receives the emergency recording signal, the master machine control unit 104 automatically changes the recording mode to the emergency mode, and starts recording the mobile body taken by the camera 102 in the recording unit 107 in the emergency mode.

To be more specific, the mobile body detected by the camera 102 is automatically displayed on the monitor 113 of the slave machine 110 as mentioned above. Then, when the user, i.e., the clerk of the convenience store in this case, detects that the mobile body displayed on the monitor 113 is a robber, the clerk operates the slave machine operation buttons 116 to transmit the emergency recording signal from the slave machine 110 to the master machine 101. When an emergency recording button is provided separately from the slave machine operation buttons 116, erroneous operations can be prevented, whereby it is more preferable.

When the master machine 101 receives the emergency recording signal, the images taken by the camera 102, which have been recorded in the normal mode until then, are recorded by the recording unit 107 in accordance with the emergency mode in which the images are recorded at higher frame advance speed than that of the normal mode.

That is, when the images are recorded at the higher frame advance speed, the motions of the mobile body, i.e., the robber in this case, are recorded in more detail, thereby being expected to be more helpful in dealing with it later.

When the monitoring device A is constructed so as to cope with the emergencies, whether or not the emergency recording is to be performed can be selected after the slave machine operation buttons 116 are operated to check the images taken by the four cameras 102. Besides, when the emergency recording is required, the slave machine operation buttons 116 are operated to control the emergency recording from a place apart from the master machine 101. Therefore, the recording can be immediately performed in the emergencies, whereby it is more suitable.

In this embodiment, the operation times of the lamp, the buzzer and the vibrator are varied with the respective cameras when the mobile body detection signal is received. However, it is also useful that the lamp, the buzzer and the vibrator are operated intermittently and the time intervals are varied, or have different rhythm or different melody for each camera. Further, it is also useful that the lamp, the buzzer and the vibrator are operated only when the mobile body is detected by the camera near the register and are not operated when the mobile body is detected by other cameras.

INDUSTRIAL AVAILABILITY

As described above, the monitoring device according to the present invention can detect mobile bodies using the warning units even when the user looks aside the monitor. In addition, the slave machine of the monitoring device has portability. Therefore, the user can carry the slave machine, thereby the mobile bodies can be detected even when the user is away from a place where the master machine of the monitoring device is installed. Accordingly, the monitoring device is particularly suitable for a use in a small-scale store such as a convenience store. When the clerk carries the slave machine, the clerk can grasp movements of customers in the store using the information transmitted by the master machine. For example, even when a customer in the store comes to the register with goods while the clerk arranges goods in shelves, the clerk knows the movement of the customer in front of the register using the warning units.

What is claimed is:

1. A monitoring device comprising one master machine and at least one slave machine, wherein the master machine comprises at least:
plural cameras;
video signal output means for outputting images taken by the plural cameras as video signals;
entrance detection means for detecting an entrance of a mobile body and outputting a mobile body detection signal, when the mobile body enters one of shooting ranges of the plural cameras;
mobile body image selection means for automatically selecting images taken by one of the cameras, which camera has shot the mobile body, in accordance with input of the mobile body detection signal;
master machine radio transmission means for transmitting the video signals and the mobile body detection signal to the slave machine as well as receiving a signal transmitted from the slave machine; and
shooting camera switching means for selecting the images taken by the camera in accordance with the signal transmitted from the slave machine, and
the slave machine comprises at least:
image selection means for selecting one of the video signals of the images taken by the plural cameras;
image selection signal generation means for outputting an image selection signal to the master machine when the image selection means are operated;
a monitor unit for displaying the video signal selected by the image selection means;
at least one warning unit for issuing a warning in accordance with the mobile body detection signal;
actuation means for actuating the warning unit when the mobile body detection signal is received; and
slave machine radio transmission means for transmitting the image selection signal as well as receiving the signals transmitted from the master machine.

2. The monitoring device of claim 1 wherein
the slave machine comprises fixing means for fixing the slave machine.

3. The monitoring device of claim 2 wherein
the fixing means is a hook.

4. The monitoring device of claim 3 wherein the warning unit is a lamp.

5. The monitoring device of claim 3 wherein the warning unit is a buzzer.

6. The monitoring device of claim 3 wherein the warning unit is a vibrator.

7. The monitoring device of claim 3 wherein the warning unit is at least one of a lamp, a buzzer and a vibrator.

8. The monitoring device of claim 2 wherein
the fixing means is a magnet.

9. The monitoring device of claim 8 wherein the warning unit is a lamp.

10. The monitoring device of claim 8 wherein the warning unit is a buzzer.

11. The monitoring device of claim 8 wherein the warning unit is a vibrator.

12. The monitoring device of claim 8 wherein the warning unit is at least one of a lamp, a buzzer and a vibrator.

13. The monitoring device of claim 2 wherein the warning unit is a lamp.

14. The monitoring device of claim 2 wherein the warning unit is a buzzer.

15. The monitoring device of claim 2 wherein the warning unit is a vibrator.

16. The monitoring device of claim 2 wherein the warning unit is at least one of a lamp, a buzzer and a vibrator.

17. The monitoring device of claim 1 wherein the warning unit is a lamp.

18. The monitoring device of claim 1 wherein the warning unit is a buzzer.

19. The monitoring device of claim 1 wherein the warning unit is a vibrator.

20. The monitoring device of claim 1 wherein the warning unit is at least one of a lamp, a buzzer and a vibrator.

21. The monitoring device of claim 1 comprising:
the mobile body detection signals as many as the plural cameras, said mobile body detection signals having contents which differ; and
the actuation means corresponding to each of the mobile body detection signals having the contents which differ.

22. The monitoring device of claim 1 wherein the slave machine comprises emergency recording operation means for recording circumstances in an emergency; and emergency recording signal generation means for generating an emergency recording signal when the emergency recording operation means are operated, and the emergency recording operation means starts recording the image taken by the plural cameras when the master machine receives the emergency recording signal.

* * * * *